(12) United States Patent
Fang et al.

(10) Patent No.: US 8,730,150 B2
(45) Date of Patent: May 20, 2014

(54) BACKLIGHT MODULE

(75) Inventors: Kuojun Fang, Shenzhen (CN); Yicheng Kuo, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 406 days.

(21) Appl. No.: 12/997,483

(22) PCT Filed: Sep. 10, 2010

(86) PCT No.: PCT/CN2010/076816
§ 371 (c)(1),
(2), (4) Date: Dec. 10, 2010

(87) PCT Pub. No.: WO2012/006808
PCT Pub. Date: Jan. 19, 2012

(65) Prior Publication Data
US 2012/0013647 A1    Jan. 19, 2012

(30) Foreign Application Priority Data

Jul. 14, 2010 (CN) .......................... 2010 1 0230802

(51) Int. Cl.
G09G 3/36 (2006.01)
F21V 7/04 (2006.01)
G02F 1/1335 (2006.01)

(52) U.S. Cl.
USPC .............................. 345/102; 362/615; 349/62

(58) Field of Classification Search
USPC ........ 345/102; 362/615, 606, 608; 349/62, 65
See application file for complete search history.

(56) References Cited

U.S. PATENT DOCUMENTS

| 2003/0210222 A1* | 11/2003 | Ogiwara et al. | 345/103 |
| 2005/0212825 A1* | 9/2005 | Lee et al. | 345/690 |
| 2007/0153548 A1* | 7/2007 | Hamada et al. | 362/615 |

FOREIGN PATENT DOCUMENTS

| CN | 1035028 C | 5/1997 |
| CN | 2563602 Y | 7/2003 |
| CN | 2580476 Y | 10/2003 |
| CN | 1227562 C | 11/2005 |
| CN | 1838220 A | 9/2006 |
| CN | 101359122 A | 2/2009 |
| JP | 4329521 A | 11/1992 |

* cited by examiner

*Primary Examiner* — Kevin M Nguyen
(74) *Attorney, Agent, or Firm* — Soroker-Agmon

(57) ABSTRACT

A backlight module capable of dynamically adjusting brightness is proposed. According to the present invention, a backlight module comprises a light guide plate for guiding light, a first light source unit, and a second light source unit. A ridge-shaped groove is disposed on the middle of the bottom surface of the light guide plate. The first light source unit and the second light source unit are respectively disposed at the opposite sides of the light guide plate. Both of the first light source unit and the second light source unit comprises at least one light source. Each of the light sources of the first light source unit is symmetrically arranged with each of the light sources of the second light source unit on a one-on-one basis. The ridge-shaped groove divides the backlight module into two independent luminance domains, each dividing into multiple subdomains. Actual luminance of each subdomain is adjustable based on its predetermined brightness and distributions, reducing power consumption and enhance an image contrast.

10 Claims, 3 Drawing Sheets

BACKLIGHT MODULE

BACKGROUND OF THE INVENTION

1. Field of the Invention

The present invention relates to a backlight module, and more specifically, to a backlight module capable of dynamically adjusting brightness.

2. Description of Prior Art

A backlight module is a key component of a liquid crystal display (LCD). For the liquid crystal fails to shine itself, the purpose of the backlight module is to provide backlight by means of a light source with sufficient brightness and even distribution, wherein the light source emits light into an optics-mechanism to simply and effectively spread as a planar light surface with high luminance and uniform brightness. Because the LCD is widely used in various electronic products such as a monitor, a notebook computer, a digital camera, and a projector, especially a high growth of the notebook and the LCD monitor using large-size LCD panels, the demand for the backlight module has increased tremendously.

The liquid crystal display (LCD) comprises a light source (e.g., light-emitting diode, LED), a reflector, a light guide plate, a diffusion sheet, a brightness enhancement film (BEF), and a liquid crystal panel. Firstly, the light emitted from the light source enters the light guide plate. The diffusing structure disposed at the bottom surface of the light guide plate guides the light to become a uniformly distributed planar light source. Next, the reflector at one side of the light guide plate reflects the light emitted to the reflector back to the light guide plate to avoid the leakage of the light and to increase the efficiency of light utilization. Next, the light emitted from the light guide plate undergoes a uniform lighting effect of the diffusion sheet and a light-gathering effect of the BEF to enhance the brightness and uniformity of the light source. Finally, the light is emitted into the liquid crystal panel.

The light guide plate is a wedge-shaped plate with a glossy surface. The bottom surface comprises diffusing structures on which a circular or square shape is engraved. A great amount of light is reflected by the reflector and conducted towards a thin end. When light hits the diffusing structure of the bottom surface, the reflected light will spread out all over, destroy the total internal reflection, and emit from the front surface of the light guide plate. The light guide plate radiates light uniformly owing to the diffusing structure with pictures of various densities and sizes.

The brightness of the light guide plate is mainly determined by the brightness of light generated by a light source. The backlight module is capable of adjusting luminance to reduce power consumption. However, for a light source on one side of the light guide plate, it is difficult to locate an illumination target region distant from light source precisely when the light source undergoes dimming. As for light sources on a two sides of the light guide plate, the brightness of the two adjacent regions is influenced by each other's light sources at both sides when the light source undergoes dimming.

SUMMARY OF THE INVENTION

It is therefore an object of the present invention is to provide a backlight module capable of dynamically adjusting brightness to solve the problem of the prior art. According to the present invention, a backlight module comprises a light guide plate for guiding light, a first light source unit, and a second light source unit. A ridge-shaped groove is disposed on the middle of the bottom surface of the light guide plate. The first light source unit and the second light source unit are respectively disposed at the opposite sides of the light guide plate. Each of the first light source unit and the second light source unit comprise at least one light source. Each of the light sources of the first light source unit is symmetrically arranged with each of the light sources of the second light source unit on a one-on-one basis. The backlight module utilizes a driving circuit for electrically connected to the first light source unit and the second light source unit and for controlling the luminance of each light sources. An actual luminance value generated by each of the light sources depends on a predetermined luminance value of the light source and on predetermined luminance values of two light sources at both sides of the light source.

In one aspect of the present invention, a cross section of the ridge-shaped groove is triangular in shape. At least one diffusing structure is disposed on the bottom surface of the light guide plate. The density of the at least one diffusing structure distributed on the surface of the light guide plate becomes greater when the at least one diffusing structure gets closer to the ridge-shaped groove.

In another aspect of the present invention, an actual luminance value generated by each of the light sources depends on the predetermined luminance value of the light source minus a first reference value, and the first reference value is calculated by a first function value relating to the predetermined luminance values of two light sources at both sides of the light source. When the predetermined luminance value of the light source is less than the first reference value, the actual luminance value generated by the light source equals to zero.

In another aspect of the present invention, an actual luminance value generated by each of the light sources depends on the predetermined luminance value of the light source minus a second reference value, and the second reference value is calculated by a sum of the first function value relating to the predetermined luminance values of two light sources at both sides of the light source and a second function value relating to the predetermined luminance value of the light source at the opposite side of the light source. When the predetermined luminance value of the light source is less than the second reference value, the actual luminance value generated by the light sources equal to zero.

In another aspect of the present invention, an actual luminance value generated by each of the light sources depends on the predetermined luminance value of the light source minus a third reference value, and the third reference value is calculated by a sum of the first function value relating to the predetermined luminance values of two light sources at both sides of the light source, the second function value relating to the predetermined luminance value of the light source at the opposite side of the light source, and a third function value relating to the predetermined luminance values of two light sources at both sides of the opposite-sided light source. When the predetermined luminance value of the light source is less than the third reference value, the actual luminance value generated by the light source equals to zero.

The prior art has the following limitations: It is difficult for a light source of a one-sided lighting type to locate an illumination target region distant from light source itself precisely when the light source undergoes dimming. As for a light source of a two-sided lighting type, the brightness of the two regions is influenced by each other's light sources at both sides when the light source undergoes local dimming. Based on these limitations, in the present invention the middle of the bottom surface of the light guide plate of the backlight module adopts a ridge-shaped groove. The ridge-shaped groove divides the backlight module into two opposite and independent light source domains. Each of the light source domains are further divided into a plurality of light source subdomains. The subdomains control an actual luminance value generated based on a predetermined luminance and a predetermined luminance distribution so that unnecessary power consumption can be reduced and that the contrast ratio of images can be enhanced.

These and other features, aspects and advantages of the present disclosure will become understood with reference to the following description, appended claims and accompanying figures.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
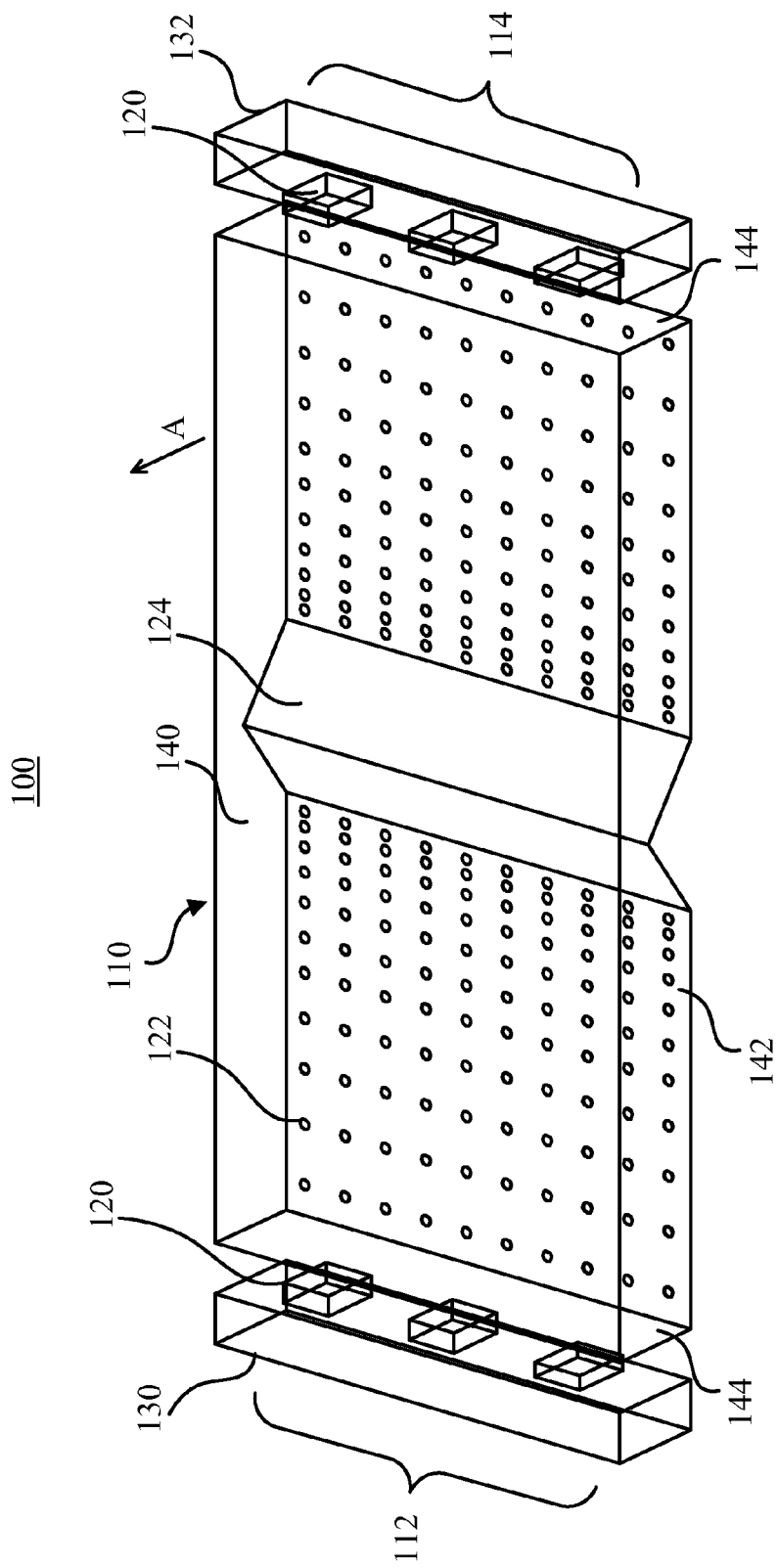
FIG. 1 shows a perspective view of a light guide plate, a first light source unit, and a second light source unit of a backlight module according to an embodiment of the present invention.

Please refer to FIG. 1, which shows a perspective view of a light guide plate 110, a first light source unit 112, and a second light source unit 114 of a backlight module 100 according to an embodiment of the present invention. The light generated by the backlight module 100 emits into the liquid crystal panel and afterward, alignments of liquid crystal molecules inside the liquid crystal panel are adjusted based on differences of driving voltages. Different alignments of the liquid crystal molecules cause differences in the light-emitting volume of the liquid crystal panel. Through a color filter, different gray levels are produced. The backlight module 100 comprises a light guide plate 110, a first light source unit 112, and a second light source unit 114. The first light source unit 112 and the second light source unit 114 are respectively disposed at two opposite sides of the light guide plate 110. The middle of the bottom surface 142 of the light guide plate 110 is a ridge-shaped groove 124. The cross section of the ridge-shaped groove 124 is triangular in shape. The first light source unit 112 and the second light source unit 114 are respectively disposed at two opposite sides of the ridge-shaped groove 124 of the light guide plate 110. Both of the first light source unit 112 and the second light source unit 114 comprise at least one light source 120. Each of the light sources 120 of the first light source unit 112 is symmetrically arranged with each of the light sources 120 of the second light source unit 114 on a one-on-one basis. The light of each of the light sources 120 emits into the light guide plate 110 from an incident surface 144 and then emits to an emitting surface 140 through a plurality of circle- or square-shaped diffusing structures 122 at the bottom surface 142 of the light guide plate 110. The density of the diffusing structures 122 becomes greater when the diffusing structures 122 get closer to the ridge-shaped groove 124. When light hits the diffusing structures 122 of the bottom surface 142, the reflected light will spread out all over, destroy total internal reflection, and emit upwards from the emitting surface 140 of the light guide plate 110, as Arrow A shows. By using the diffusing structures 122 with patterns of various densities and sizes, the light guide plate can radiate light uniformly. The diffusing structures 122 can also be made of granular materials having different refractive indexes. By means of the scattering effect of light and granules, light can be emitted from the surface of the light guide plate 110.

Figure 2:
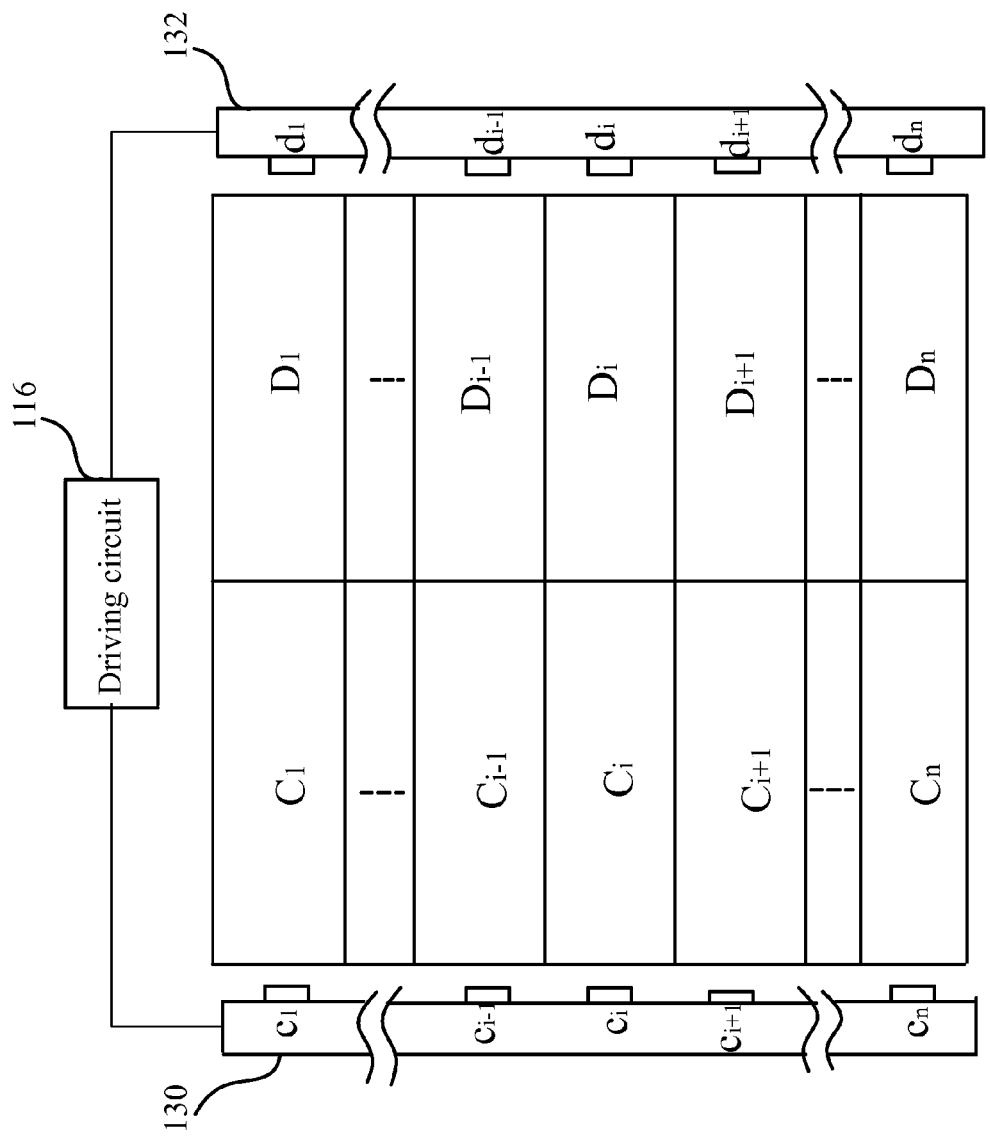
FIG. 2 is a schematic diagram of the first light source unit, the second light source unit, and a driving circuit of the backlight module.

Please refer to FIG. 1 and FIG. 2. FIG. 2 is a schematic diagram of the first light source unit 112, the second light source unit 114, and a driving circuit 116 of the backlight module 100. Each of the light sources 120 is an LED. The driving circuit 116 is electrically connected to the first light source unit 112 and the second light source unit 114 to control luminance of each of the light sources 120 through printed circuit boards (PCBs) 130 and 132. Each of the light sources 120 is restricted to its individual illumination angle and intensity, so its individual effective luminance domain is restricted to a certain extent. To simplify descriptions, the light guide plate 110 is divided into a luminance domain C corresponding to the first light source unit 112 and a luminance domain D corresponding to the second light source unit 114 by the ridge-shaped groove 124 in the present embodiment. The luminance domain C is further divided into luminance domains $C_1$-$C_n$. The brightness of each luminance domain $C_i$ is controlled by a light source $c_i$ of the first light source unit 112. Similarly, the luminance domain D is further divided into luminance domains $D_1$-$D_n$. The brightness of each luminance domain $D_i$ is controlled by a light source $d_i$ of the second light source unit 114. In the present embodiment, the light source $c_i$ and the light source $d_i$ are both the light sources 120 and are symmetrical with each other.

The display brightness of the luminance domain $C_i$ is influenced not only by the light source $c_i$ but also by adjacent luminance domains $C_{i\pm1}$, $D_i$, and $D_{i\pm1}$. So the driving circuit 116 detects a predetermined luminance of each luminance domain $C_i$ and each luminance domain $D_i$ in advance based on a driving signal. Afterwards, the driving circuit 116 properly adjusts the luminance of each light source $c_i$ and each light source $d_i$ based on a predetermined algorithm. In this way, the target of dynamic dimming can be successfully achieved.

Take the luminance domain $C_i$ for example. The luminance of the luminance domain $C_i$ is mainly controlled by the light source $c_i$ and is also influenced to varying degrees by the subdomains $C_{i\pm1}$ at both sides and the subdomains $D_i$ and $D_{i\pm1}$ at the opposite side. During a scanning period of a frame of an image, the luminance domains $C_{i-1}$, $C_i$, $C_{i+1}$, $D_{i-1}$, $D_i$, and $D_{i+1}$ correspond to average display brightness $L'_{i-1}$, $L'_i$, $L'_{i+1}$, $L''_{i-1}$, $L''_i$, and $L''_{i+1}$, respectively. The actual brightness of the luminance domain $C_i$ is adjusted based on distances between the light source $c_i$ and the light sources $c_{i-1}$, $c_{i+1}$, $d_{i-1}$, $d_i$, $d_{i+1}$, and based on predetermined luminance of subdomains $C_{i+1}$, $C_{i+1}$, $D_{i-1}$, $D_i$, and $D_{i+1}$, controlled by the light sources $c_{i-1}$, $c_{i+1}$, $d_{i-1}$, $d_i$, $d_{i+1}$, respectively. For example, because the light source $c_i$ far from the light sources $c_{i-1}$ is as the same as from the light source $c_{i+1}$, the light sources $c_{i-1}$ and $c_{i+1}$ affect the luminance domain $C_i$ in a similar extent, and the brightness functions $f(L'_{i-1})$, $f(L'_{i+1})$ with the identical coefficients are adopted, accordingly. Similarly, because the light source $c_i$ far from the light sources $d_{i-1}$ is as the same as from the light source $d_{i+1}$, the light sources $d_{i-1}$ and $d_{i+1}$ the luminance domain $C_i$ in a similar extent, and the brightness functions $g(L''_{i-1})$, $g(L''_{i+1})$ with the identical coefficients are adopted, accordingly. In addition, the light source $d_i$ opposite to the light source $c_i$ affects luminance domain $C_i$ by another brightness function $h(L''_i)$ with coefficients independent of the brightness functions f, g. It is noted that the brightness functions f, g, h are independent. Therefore, the actual luminance $X'_i$ of each light source $c_i$ is determined by its predetermined brightness $L'_i$, by the brightness functions $f(L'_{i-1})$ and $f(L'_{i+1})$ associated with the light sources $c_{i+1}$ and $c_{i-1}$ which is on the two sides of the light source $c_i$, the brightness function $h(L''_i)$ associated with the light source $d_i$ which is on the opposite side of the light source $c_i$, and by the brightness functions $g(L''_{i-1})$, $g(L''_{i+1})$ associated with the light sources $d_{i+1}$ and $d_{i-1}$ which is on the two sides of the light source $d_i$.

In sum, the actual luminance of the luminance domain $C_i$ is determined by the following brightness functions: $f(L'_{i-1})$, $f(L'_{i+1})$, $L'_i$, $g(L''_{i-1})$, $h(L''_i)$, $g(L''_{i+1})$. The f, g, and h, representing different brightness functions, are determined by a relative position of a corresponding subdomain.

The driving circuit 116 receives the predetermined luminance of the luminance domain $C_i$ and of the adjacent luminance domains $C_{i-1}$, $C_{i+1}$, $D_{i-1}$, $D_i$, and $D_{i+1}$ and subsequently controls the light source $c_i$ to adjust the brightness of the luminance domain $C_i$. The driving circuit 116 modulates the actual brightness of the light source $c_i$ according to Formula 1 as shown below.

$$X'_i = L'_i - \Delta L'_i = L'_i - [f(L'_{i-1}) + f(L'_{i+1}) + g(L''_{i-1}) + h(L''_i) + g(L''_{i+1})], \quad \text{(Formula 1)}$$

when $\Delta L'_i \geq L'_i$, $X'_i = 0$.

where $\Delta L'_i$ means a reference brightness value of surrounding subdomains $C_{i-1}$, $C_{i+1}$, $D_{i-1}$, $D_i$, $D_{i+1}$ relative to the predetermined brightness $L'_i$ of the luminance domain $C_i$. When $\Delta L'_i \geq L'_i$, the brightness of the light source $c_i$ is zero, i.e., the light source $c_i$ does not light. As to the luminance domain $C_i$ situated at both sides, e.g, the luminance domain $C_1$, the brightness of the luminance domain $C_1$ is merely influenced by the luminance domains $C_2$, $D_1$, and $D_2$. So the actual brightness of the luminance domain $C_1$ is modulated as:

$$X'_1 = L'_1 - \Delta L'_1 = L'_1 - [f(L'_2) + h(L''_1) + g(L''_2)].$$

The driving circuit 116 can also disregard the influence of diagonal subdomains and modulate the actual brightness of the light source $c_i$ according to Formula 2 as shown below.

$$Y'_i = L'_i - \Delta L'_i = L'_i - [f(L'_{i-1}) + f(L'_{i+1}) + h(L''_i)], \quad \text{(Formula 2)}$$

when $\Delta L'_i \geq L'_i$, $Y'_i = 0$.

where $\Delta L'_i$ means a reference brightness value of surrounding subdomains $C_{i-1}$, $C_{i+1}$, $D_i$, relative to the predetermined brightness $L'_i$ of the luminance domain $C_i$. When $\Delta L'_i \geq L'_i$ the brightness of the light source $c_i$ is zero, i.e., the light source $c_i$ does not light. As to the luminance domain $C_i$ situated at both sides, e.g, the luminance domain $C_1$, the brightness of the luminance domain $C_1$ is merely influenced by the luminance domains $C_2$ and $D_1$. So the actual brightness of the luminance domain $C_1$ is modulated as:

$$Y'_1 = L'_1 - \Delta L'_1 = L'_1 - [f(L'_2) + h(L''_1)].$$

The driving circuit 116 can also disregard the influence of all of the opposite side subdomains and can modulate the actual brightness of the light source $c_i$ according to Formula 3 as shown below.

$$Z'_i = L'_i - \Delta L'_i = L'_i - [f(L'_{i-1}) + f(L'_{i+1})], \quad \text{(Formula 3)}$$

when $\Delta L'_i \geq L'_i$, $Z'_i = 0$ where $\Delta L'_i$ means a reference brightness value of surrounding subdomains $C_{i-1}$, $C_{i+1}$, relative to the predetermined brightness $L'_i$ of the luminance domain $C_i$. When $\Delta L'_i \geq L'_i$, the brightness of the light source $c_i$ is zero, i.e., the light source $c_i$ does not light. As to the luminance domain $C_i$ situated at both sides, e.g, the luminance domain $C_1$, the brightness of the luminance domain $C_1$ is merely influenced by the luminance domains $C_2$. So the actual brightness of the luminance domain $C_1$ is modulated as:

$$Z'_1 = L'_1 - \Delta L'_1 = L'_1 - f(L'_2).$$

Figure 3A:
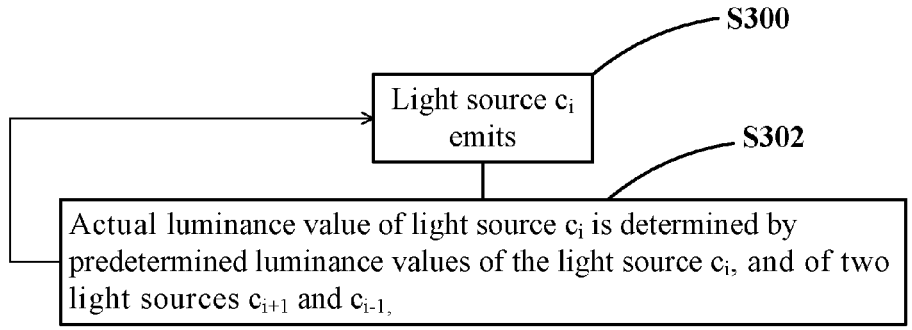
FIGS. 3a, 3b, and 3c are flow charts showing various adjustments of a brightness of a light source of the backlight source in the present invention.
Figure 3B:
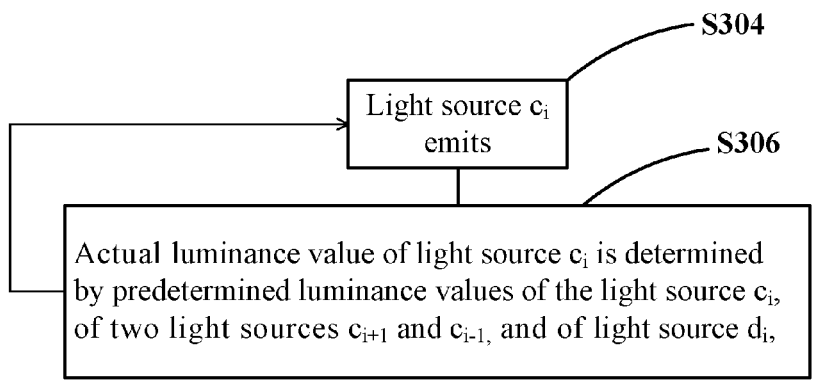
Figure 3C:
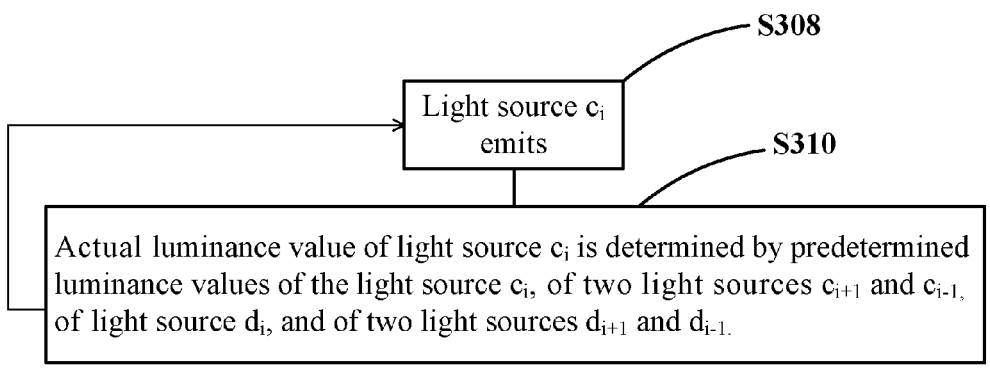

Please refer to FIGS. 3a, 3b, and 3c, which are flow charts showing various adjustments of the brightness of a light source of the backlight source in the present invention. As shown in FIG. 3a, an actual luminance value generated by each light source $c_i$ is determined by a predetermined luminance value of the light source $c_i$ and by predetermined luminance values of two light sources $c_{i+1}$ and $c_{i-1}$ at both sides of the light source $c_i$. Or, as shown in FIG. 3b, an actual luminance value generated by each light source $c_i$ is determined by predetermined luminance values of the light source $c_i$ of two light sources $c_{i+1}$ and $c_{i-1}$ at both sides of the light source $c_i$, and of the light source $d_i$ at the opposite side of each light source $c_i$. Or, as shown in FIG. 3c, an actual luminance value generated by each light source $c_i$ is determined by predetermined luminance values of the light source $c_i$, of two light sources $c_{i+1}$ and $c_{i-1}$ at both sides of each light source $c_i$, of the light source $d_i$ at the opposite side of each light source $c_i$, and of two light sources $d_{i+1}$ and $d_{i-1}$ at both sides of the opposite-sided light source $d_i$.

Owing to the ridge-shaped groove 124 in the middle of the light guide plate 110, the distance for the light source 120 to emit light is reduced to be half of the original distance. The two light sources 120 can control their individual luminance domain comparatively independently. The driving circuit 116 dynamically adjusts the luminance of each of the light sources 120, so that the brightness of the emitting surface 140 of the light guide plate 110 can be controlled depending on individual domains. Meanwhile, the ridge-shaped groove 124 in the middle of the light guide plate 110 enhances the brightness of the middle region of the emitting surface 140 of the light guide plate 110 comparatively, which suits the human eye.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A backlight module comprising a light guide plate for guiding light, a first light source unit, and a second light source unit; the first light source unit and the second light source unit being respectively disposed at the opposite sides of the light guide plate; both of the first light source unit and the second light source unit comprising one or more light sources; each of the light sources of the first light source unit being symmetrically arranged with each of the light sources of the second light source unit on a one-on-one basis, characterized in that: a ridge-shaped groove is disposed on the middle of a bottom surface of the light guide plate;

the backlight module further comprises a driving circuit electrically connected to the first light source unit and the second light source unit for controlling the luminance of each of the light sources; wherein an actual luminance value generated by each of the light sources depends on a predetermined luminance value of the each light source minus a first reference value, and the first reference value is calculated by a first function value relating to the predetermined luminance values of light sources at both sides of the each light source.

2. The backlight module of claim 1, characterized in that a cross section of the ridge-shaped groove is triangular in shape.

3. The backlight module of claim 1 or 2, characterized in that at least one diffusing structure is disposed on the bottom surface of the light guide plate; wherein the density of the at least one diffusing structure distributed on the surface of the light guide plate becomes greater when the at least one diffusing structure gets closer to the ridge-shaped groove.

4. The backlight module of claim 1, characterized in that when the predetermined luminance value of the light source is less than the first reference value, the actual luminance value generated by the light source equals to zero.

5. The backlight module of claim 1, characterized in that an actual luminance value generated by each of the light sources depends on the predetermined luminance value of the light source, on the predetermined luminance values of the two light sources at both sides of the light source, and on a predetermined luminance value of a light source at the opposite side of the light source.

6. The backlight module of claim 5, characterized in that the actual luminance value generated by each of the light sources depends on the predetermined luminance value of the light source minus a second reference value, and the second reference value is calculated by a sum of the first function value relating to the predetermined luminance values of the two light sources at both sides of the light source and a second function value relating to the predetermined luminance value of the light source at the opposite side of the light source.

7. The backlight module of claim 6, characterized in that when the predetermined luminance value of the light source is less than the second reference value, the actual luminance value generated by the light source equals to zero.

8. The backlight module of claim 5, characterized in that an actual luminance value generated by each of the light sources depends on the predetermined luminance value of the light source, on the predetermined luminance values of the two light sources at both sides of the light source, and on the predetermined luminance value of the light source at the opposite side of the light source, and on predetermined luminance values of two light sources at both sides of the opposite-sided light source.

9. The backlight module of claim 8, characterized in that the actual luminance value generated by each of the light sources depends on the predetermined luminance value of the light source minus a third reference value, and the third reference value is calculated by a sum of the first function value relating to the predetermined luminance values of the two light sources at both sides of the light source, the second function value relating to the predetermined luminance value of the light source at the opposite side of the light source, and a third function value relating to the predetermined luminance values of two light sources at both sides of the opposite-sided light source.

10. The backlight module of claim 9, characterized in that when the predetermined luminance value of the light source is less than the third reference value, the actual luminance value generated by the light source equals to zero.

\* \* \* \* \*